United States Patent [19]

Kakuda et al.

[11] Patent Number: 4,831,475
[45] Date of Patent: May 16, 1989

[54] MAGNETIC DISC DEVICE INCLUDING DEVICE FOR CONTROLLING HUMIDITY IN A DISC ENCLOSURE

[75] Inventors: Masatoshi Kakuda; Chiaki Kawamura; Hiroshi Baba, all of Kamakura, Japan

[73] Assignee: Mitsubishi Denki Kabushiki Kaisha, Tokyo, Japan

[21] Appl. No.: 115,734

[22] Filed: Oct. 29, 1987

[30] Foreign Application Priority Data

Oct. 30, 1986 [JP] Japan ................................. 61-259135

[51] Int. Cl.$^4$ ............................................. G11B 5/012
[52] U.S. Cl. ................................ 360/97.03; 236/44 R; 423/210
[58] Field of Search ...................................... 360/97–99; 423/210; 236/44 R

[56] References Cited

U.S. PATENT DOCUMENTS

| 4,307,425 | 12/1981 | Kaneko et al. | 360/98 |
| 4,620,248 | 10/1986 | Gitzendanner | 360/97 |
| 4,684,510 | 8/1987 | Harkins | 360/97 X |

FOREIGN PATENT DOCUMENTS 2051603A 1/1981 United Kingdom .
2166584A 5/1986 United Kingdom .

Primary Examiner—John H. Wolff
Attorney, Agent, or Firm—Sughrue, Mion, Zinn, Macpeak & Seas

[57] ABSTRACT

A magnetic disc device includes a moisture removing mechanism within an enclosure of the device. The mechanism employs a reversible desiccating agent which is capable of not only absorbing moisture but also discharging moisture depending on the surrounding conditions. The reversible desiccating agent cyclically absorbs and discharges moisture in response to a change in temperature and a change in humidity due to the intrusion of the moisture from outside the enclosure. The moisture removing mechanism can be used for a long period of time with a small amount of desiccating agent. Thus, it is possible to make the moisture removing mechanism small and to provide it with long life.

5 Claims, 3 Drawing Sheets

REVERSIBLE DESICCATING AGENT

NON-REVERSIBLE DESICCATING AGENT

MAGNETIC DISC DEVICE INCLUDING DEVICE FOR CONTROLLING HUMIDITY IN A DISC ENCLOSURE

BACKGROUND OF THE INVENTION

The present invention relates to a magnetic disc device used as an external memory of an electronic computer, and in particular, to an improvement in a dehumidifying or moisture removing mechanism employed in the magnetic disc device.

FIG. 1 is a sectional view of a known magnetic disc device disclosed, for example, in U.S. Pat. No. 4,307,425. In FIG. 1, magnetic discs 1 have data written to and read from them by a magnetic head (not shown). The discs 1 are provided within an enclosure 3 which covers a base 2 on which various elements of the device are mounted. A spindle motor 4 provided on the lower surface of the base 2 rotates the magnetic discs 1. A first throttle, or restricted opening 5 provided in an opening bored in the base 2 regulates the amount of air passing therethrough, and a breathing filter 6 is provided beneath the lower surface of the base 2 to cover the first throttle 5. The breathing filter 6 adjusts a pressure difference between the inside and outside of the enclosure 3 while maintaining a dust-proof condition.

A dehumidifying mechanism or moisture removing mechanism 7 absorbs moisture within the enclosure 3 to maintain a low humidity condition. The moisture removing mechanism 7 comprises a desiccating agent 8 including silica gel or the like, a container 9 for accommodating the desiccating agent 8, a filter 10 located at an opening of the container 9 for preventing the fine powder or dust of the desiccating agent 8 from flowing out of the container 9, and a second throttle or restricted opening 11 provided in an opening bored in the base 2 for regulating the moisture absorbing rate of the desiccating agent 8. The container 9 is fixed beneath the lower surface of the base 2 so that the container 9 convers the second throttle 11.

In the magnetic disc device so configured, moisture entering the enclosure 3 through the breathing filter 6 is absorbed by the desiccating agent 8, and the relative humidity inside the enclosure 3 is low relative to the outside atmosphere. With such an arrangement, it is possible to reduce the rate of deterioration of the magnetic discs 1 and also to reduce the occurrence of adhesion between the magnetic discs 1 and the head.

One deficiency of known magnetic disc devices as described above relates to the large amount of desiccating agent necessary for reliable operation. The amount of moisture entering into the inside of the enclosure 3 depends on the configuration of the first throttle 5. If the first throttle 5 has two stages of openings each having a diameter of 0.25 mm and a length of 1 mm, the amount of water intruding into the enclosure 3 would be approximately 12 mg per day. Thus, the total amount of water intruding during a 5-year lifetime of the device would be approximately 22 g ($=12$ mg$\times 365 \times 5$). Where silica gel (JIS (Japanese Industrial Standard) - Z0701), having a water absorbing ability of 25% by weight ratio, is used as a desiccating agent, the amount required will be 88 g ($=22 \div 0.25$). Since the apparent specific weight of the silica gel is 0.9, its volume will be 98 cm$^3$ ($=88 \div 0.9$).

It should be noted that the amount of intruding water does not depend on the capacity of the enclosure 3, which determines the external size of the device. Hence, the volume of the desiccating agent 8 should not depend on the capacity of the enclosure 3. As a result, no matter how small the device is, in order to maintain reliability over the lifetime of the device, the same amount of the desiccating agent 8 would be necessary.

With the magnetic disc device arranged as described above, the volume of the desiccating agent 8 was large, and there was a limit as to how small the device could be made. For example, in a device having one or more thin fixed discs with a diameter of 130 mm, the external volume of the device would be approximately 1,215 cm$^3$ (146 mm$\times$41 mm$\times$203 mm). In this case, the capacity of the enclosure 3 would be about 400 cm$^3$, and further, the amount of space available for accommodating the desiccating agent 8 would be about 20 cm$^3$. However, since 98 cm$^3$ was required for the desiccating agent 8 using the silica gel, apparently it is impossible to accommodate the desiccating agent 8 in the enclosure 3. As a result, in the device as shown in FIG. 1, the moisture removing mechanism 7 must be provided outside the enclosure 3 to accommodate the required amount of the desiccating agent 8.

Alternatively, the desiccating agent 8 could be provided, to the extent that space was available, in the enclosure 3. However, in that case, since the necessary amount of desiccating agent would take up too much room, reliability inevitably would be sacrificed. As a result, it was difficult to provide an effective moisture removing mechanism 7 within an enclosure of a small disc drive.

SUMMARY OF THE INVENTION

In view of the foregoing deficiencies, it is an object of the present invention to provide a highly reliable magnetic disc device having a small moisture removing mechanism.

This object is accomplished by the present invention, wherein a magnetic disc device comprises an enclosure for accommodating at least one magnetic disc therein, a breathing filter for regulating a pressure difference between the inside and outside of the enclosure in a dust-proof condition, and a moisture removing mechanism including a container having a filter to contain a desiccating agent therein, the moisture removing mechanism removing the moisture intruding through the breathing filter. A reversible desiccating agent, which performs both a moisture absorbing action and a moisture discharging action in response to a rise and a fall in humidity, is used as the desiccating agent.

BRIEF DESCRIPTION OF THE DRAWINGS

The present invention now will be described with reference to the accompanying drawings, in which.

DETAILED DESCRIPTION OF THE PREFERRED EMBODIMENTS

Figure 1:
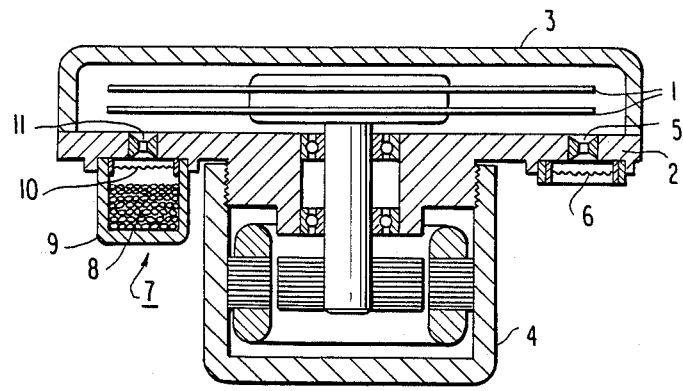
FIG. 1 is a sectional view of a conventional magnetic disc device.
Figure 2:
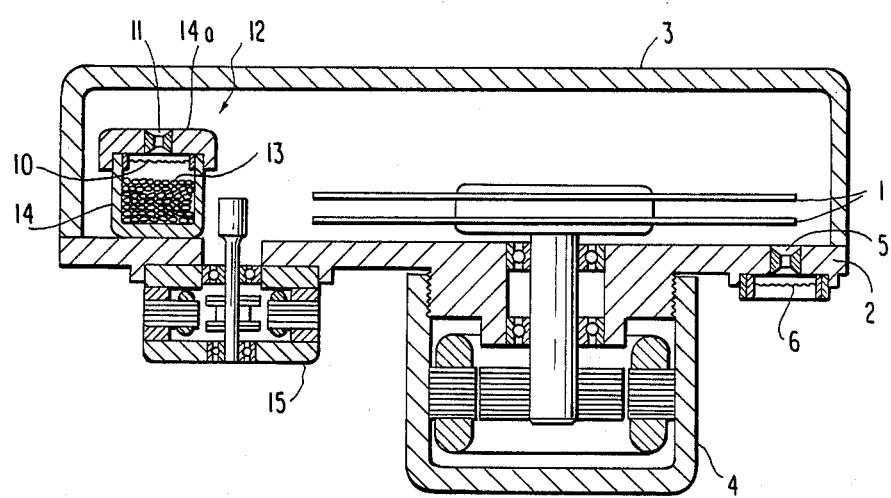
FIG. 2 is a sectional view of one embodiment of a magnetic disc device in accordance with the present invention.

Preferred embodiments of the present invention will be described hereinafter with reference to the drawings. FIG. 2 is a sectional view of a magnetic disc device according to an embodiment of the invention, in which identical or corresponding parts to those in the device shown in FIG. 1 are designated by the identical reference numerals, and explanations thereof are omitted.

In FIG. 2, a moisture removing mechanism 12 is provided within the enclosure 3. A known reversible desiccating agent 13, which wil be described in detail later, is used as the desiccating agent in the moisture removing mechanism 12. The reversible desiccating agent 13 is accommodated in a metallic container 14 which has a cover 14a formed with a second throttle 11 and also has a filter 10. The container 14 is fixed to an upper surface of the base 2 so that the container 14 is disposed at a predetermined position within the enclosure 3. Further, numeral 15 designates an actuator for driving a magnetic head (not shown).

Figure 3A:
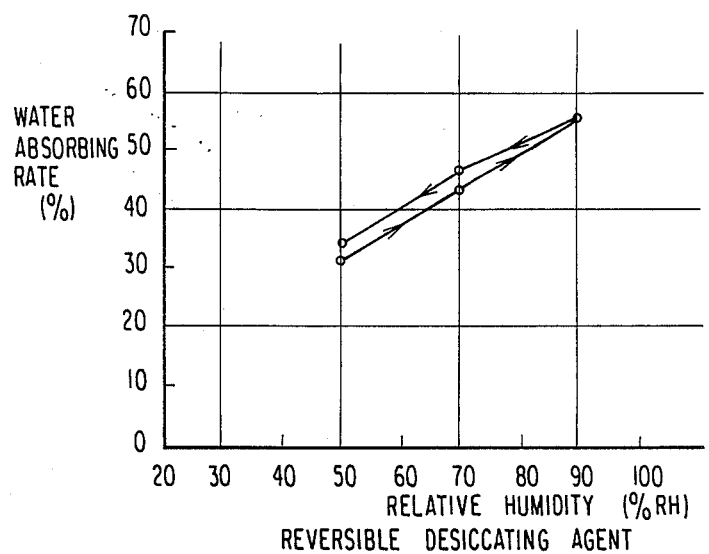
FIGS. 3a and 3b are graphs showing moisture absorbing characteristics of reversible and non-reversible desiccating agents.

The operation of the present invention now will be described. First, the property of the reversible desiccating agent 13 will be described with reference to FIG. 3a. FIG. 3a shows the moisture absorbing property of a reversible desiccating agent, for example, an agent sold under the trade name "Doraikaratto" (sold by K.K. TOHTAKU, 4-12-20, Ginza, Chuo-ku, Tokyo). (With respect to "Doraikaratto', a method of manufacturing a grain-type desiccating agent is disclosed in Japanese Laid-Open Patent Publication No. 53-96985.)

The moisture absorbing rate under a low humidity condition (relative humidity 50%) was measured as 30.5%, according to a method prescribed in JIS-Z0701-1977. Next, under a condition of 70% relative humidity, the water absorbing rate was 43.1%, and under a high humidity condition (relative humidity 90%), the water absorbing rate was 54.8%.

Next when the relative humidity was lowered from 90% to 70%, the water absorbing rate of the reversible desiccating agent fell to 46.0%, and when the relative humidity was lowered further to 50%, the water absorbing rate also fell, to 33.7%. In other words, it was found that when humidity increased, the weight of the desiccating agent increased by absorbing the moisture. However, humidity was lowered again, the weight decreased by discharging the moisture. This is why such a desiccating agent is called a reversible desiccating agent.

Figure 3B:
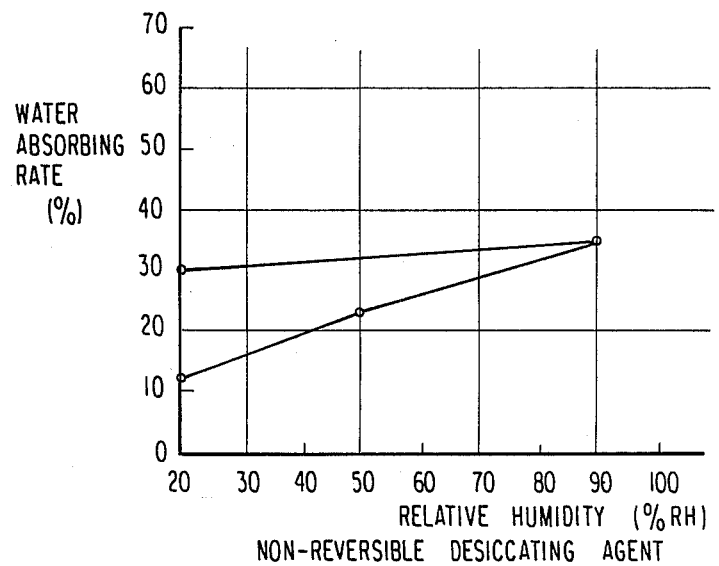

Here, for purposes of comparison, the characteristics of a non-reversible desiccating agent will be described with reference to FIG. 3b. Silica gel, as prescribed in JIS-Z0701, generally is known as a conventionally used desiccating agent. With silica gel, in the process of increasing the relative humidity from 20% to 50% and then to 90%, the water absorbing rate changed from 12% to 23% to 35%, respectively. Conversely, when the relative humidity decreased to 20%, the water absorbing rate was 29%. Thus, when such a desiccating agent returns to a low humidity condition from a high humidity condition, it does not release all the water it absorbed originally, and so it is called a non-reversible desiccating agent.

Figure 4:
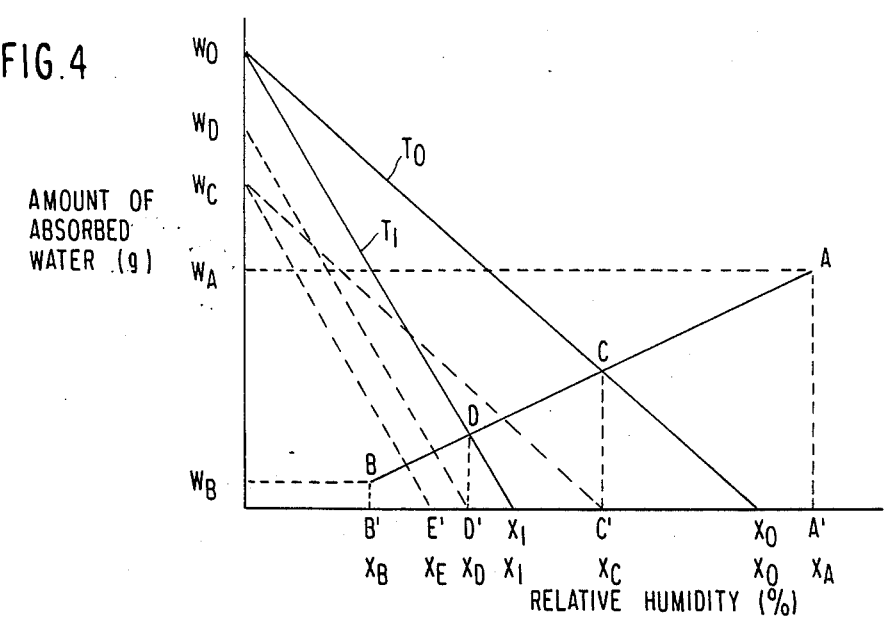
FIG. 4 is a graph showing operating characteristics of the embodiment of the present invention.

Now, in considering the humidity within the enclosure 3 of the magnetic disc device, it should be noted that the inside temperature distribution conditions may differ depending on whether the magnetic disc device is turned on or off. The desiccating agent may behave differently depending upon these conditions. FIG. 4 shows operating characteristics of an embodiment of the present invention using the reversible desiccating agent 13 in the moisture removing mechanism 12.

In FIG. 4, a curve AB represents the characteristics of the reversible desiccating agent 13 which is accommodated in the container 14 having the second throttle 11. The curve AB indicates that the amount of water absorbed by the reversible desiccating agent 13 is $W_A$ when the relative humidity is $X_A$, and it is $W_B$ when the relative humidity is $X_B$. Next, a curve $W_O X_O$ represents the characteristics within the enclosure 3 when the temperature is $T_0$ (°C.) and the reversible desiccating agent 13 is not used. Specifically, this curve $W_0 X_0$ indicates that when $W_0$ grams of water are contained within the enclosure 3 which has no reversible desiccating agent 13 therein, the relative humidity within the enclosure 3 is $X_0\%$.

Next, when the reversible desiccating agent 13 is placed in the enclosure 3, the moisture within the enclosure 3 is absorbed and the equilibrium condition is attained at a point C in FIG. 4, that is, at relative humidity $X_C$. At this time, the reversible desiccating agent 13 has absorbed $W_0 - W_C$ grams of moisture corresponding to C C'.

Now when the inside temperature of the enclosure 3 rises to $T_1$ °C., since the saturated water vapor pressure rises with temperature, the operating point in the equilibrium condition is lowered to a point D in FIG. 4 corresponding to a relative humidity of $X_D$ ($X_1$ represents relative humidity at a temperature $T_1$ when no reversible desiccating agent 13 exists).

Next, change in the amount of water absorbed by the reversible desiccating agent 13 during transition of the operating point from C to D will be described. In FIG. 4, at the operating point C, the reversible desiccating agent 13 absorbs the water corresponding to $W_0 - W_C = C C'$. However, at the operating point D, the water corresponding to $W_0 - W_D = D D'$ is absorbed. As is apparent in FIG. 4, since $C C' > D D'$, then $W_0 - W_C > W_0 - W_D$. Thus, when the operating point moves from C to D, an amount of water corresponding to $W_D - W_C$ is discharged from the desiccating agent. In other words, when there is a change in inside temperature of the enclosure 3, the reversible desiccating agent 13 absorbs or discharges the moisture so that the operating point is moved to C or D to attain equilibrium in relative humidity inside the enclosure 3.

Further, when no desiccating agent exists within the enclosure 3, the humidity change inside the enclosure 3 will be $X_0 - X_1$, whereas if the reversible desiccating agent 13 is used, the humidity change will be $X_C - X_D$. However, since $X_C - X_D < X_0 - X_1$, the width of the humidity change becomes small if the reversible desiccating agent 13 is used. That is, the humidity approaches a constant. On the other hand, with respect to the average humidity, since there is a relationship:

$$(X_C + X_D)/2 < (X_0 + X_1)/2$$

the average humidity decreases when the reversible desiccating agent 13 is used.

If the desiccating agent is of the non-reversible type, since it is not expected that the desiccating agent would discharge the moisture when the inside temperature rises from $T_0$ to $T_1$, the inside humidity will become $X_E$ ($<X_D$) in FIG. 4, in which $W_C E' || W_0 X_1$, and an excessively dry condition will be created.

Figure 5A:
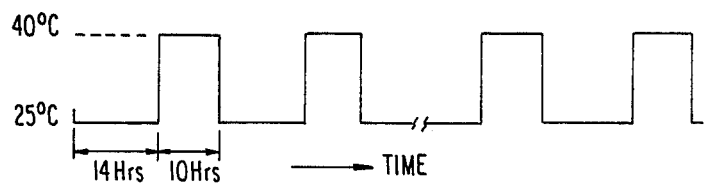
FIGS. 5a, 5b and 5c are graphs showing changes respectively in temperature, relative humidity, and the amount of absorbed water in the reversible desiccating agent.

In most cases the magnetic disc device is used in a cycle wherein the device is turned off for 14 hours in a day and is turned on and operated for the remaining 10 hours. FIG. 5a shows changes in temperature within the enclosure 3 in such a case. In this example, the temperatures is 25° C. when the device is turned off, and it rises to 40° C. when it is turned on, yielding a temperature rise of 15° C. due to the heat generated by the rotation of the magnetic discs 1 the rotation of spindle motor 4, the operation of the actuator 15, etc.

Figure 5B:
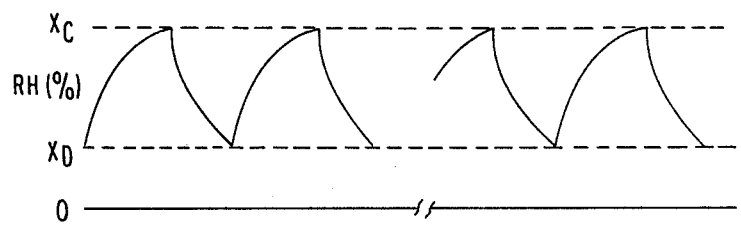

The relative humidity within the enclosure 3 varies as shown in FIG. 5b, from $X_D$ to $X_C$. When the device is turned off, although the inside humidity rises, it is limited to a constant value $X_C$ by the moisture absorbing action of the reversible desiccating agent 13. Further, although the inside humidity falls when the device is turned on, it is limited to a constant value $X_D$ by the moisture discharging action of the reversible desiccating agent 13 so that the excessively dry condition is prevented.

Figure 5C:
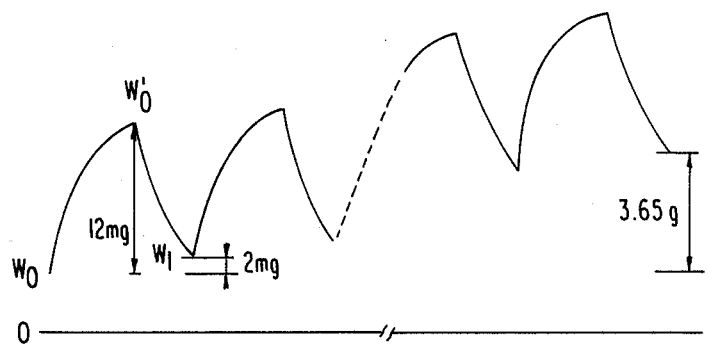

On the other hand, the weight of the reversible desiccating agent 13 increases and decreases repeatedly, as shown in FIG. 5c. In every one day cycle, there is $W_0' - W_0 = 12$ mg moisture absorption of, and moisture discharge of $W_0' - W_1 = 10$ mg, yielding a moisture increase of $W_1 - W_0 = 2$ mg per day. Consequently, the moisture increase during an expected 5-year lifetime of the device will amount to 3.65 grams ($=2 \times 365 \times 5$ mg). If the above-mentioned "Doraikaratto" is used as the reversible desiccating agent 13, since the water absorbing ability near the relative humidity of 50% is 30% by weight ratio, the required amount of the reversible desiccating agent 13 will be 12.2 grams ($=3.65 \div 0.30$). since the apparent specific weight of the "Doraikaratto" is 0.7, the volume of the reversible desiccating agent 13 will be 17.4 cm$^3$ ($=12.2 \div 0.7$). As a result, it becomes possible to accommodate the reversible desiccating agent 13 in the small-type magnetic disc device which employs a magnetic disc having a diameter of 130 mm as mentioned above and which has an available accommodating capacity of only 20 cm$^3$ for the desiccating agent.

Next, the layout of the moisture removing mechanism 12 will be described. Primary heat generating sources in a magnetic disc device include the magnetic discs 1, spindle motor 4, and actuator 15. When the magnetic discs 1 rotate at high speeds, they generate windage loss which changes in an amount proportional to about a cube of the rotational speed, and the air inside the enclosure 3 is heated. The spindle motor 4 and actuator 15 are electrical machines and they generate heat due to current loss and mechanical loss. The heat generated by these members heats the base 2, and thus heats indirectly the air inside the enclosure 3. As described in the foregoing, in order to extend the lifetime of the moisture removing mechanism 12, it is most important to use a desiccating agent 13 which has reversible moisture absorbing characteristics. However, in order to further enhance its effect, it is preferable to dispose the moisture removing mechanism 12 in the vicinity of the spindle motor 4 or the actuator 15, and also to place the moisture removing mechanism 12 along the passage of wind or air flow caused by the rotation of the magnetic discs 1.

By disposing the moisture removing mechanism 12 in this manner, it is possible to make the temperature change in the moisture removing mechanism 12 large between the on and off time of the magnetic disc device, and this in turn enables the desiccating agent 13 to discharge the moisture sufficiently. As a result, it is possible to reduce the increase in weight of the desiccating agent 13 due to moisture absorption during the cycle of moisture absorption and moisture discharge.

It has been known to use a synthetic resin as the material for the container 14 of the moisture removing mechanism 12. However, in order to enhance the efficiency of the moisture removing mechanism 12, it is preferable to use metal, to improve heat conduction from the base 2 so that the container 14 is easily heated.

Further, it is possible to control the moisture absorbing ability per unit time in accordance with the size of the second throttle 11. In order to increase the slope of the characteristic curve A-B in FIG. 4, the opening diameter of the throttle 11 may be enlarged.

In the embodiment described above, the "Doraikaratto" (trade name) is used as the reversible desiccating agent. However other desiccating agents, for example, "Nissodoraic-C" (trade name, sold by K.K. KANTO SHOKAI, 1-44-8 Higashi Ikebukuro, Toshima-ku, Tokyo) may be used. "Doraikaratto" (trade name) has the following composition: 71.43% $SiO_2$; 10.67% $Al_2O_3$; 2.24% CaO; 2.49% $Fe_2O_3$; 2.29% $K_2O$; 0.85% $Ne_2O$; 0.40% $P_2O_5$; 3.05% trace mineral elements; and no more than 2.7% water. Nissodorai-C (trade name) has the following composition: 50.0% $CaCl_2 \cdot H_2O$; 21.8% $SiO_2$; 12.4% MgO; 10.2% $Al_2O_3$; 4.8% $Fe_2O_3$; and 0.7% FeO.

Finally, it should be noted that the disclosed invention is not to be construed as necessarily limited to the embodiments disclosed. Rather, the invention is to be construed in light of the appended claims.

What is claimed is:

1. A magnetic disc device comprising:
   (a) at least one magnetic disc (1);
   (b) a base (2);
   (c) an enclosure (3) covering said base and containing said at least one magnetic disc;
   (d) a breathing filter (6) for regulating a pressure difference between the inside and outside of said enclosure under a dust-proof condition; and
   (e) a moisture removing mechanism placed in said enclosure and including:
      a container (14);
      a filter (10) within said container; and
      a reversible desiccating agent (13) contained in said container, said reversible desiccating agent performing a moisture absorbing action and a moisture discharging action in accordance with an increase and decrease in relative humidity within said enclosure respectively, substantially all moisture absorbed during said moisture absorbing action being discharged by said moisture discharging action, said moisture removing mechanism removing the moisture intruding into said enclosure through said breathing filter, wherein said reversible desiccating agent is selected from the group consisting of a first compound consisting essentially of $SiO_2$, $Al_2O_3$, CaO, $FeO_3$, $Ne_2O$, $K_2O$, and $P_2O_5$, and a second compound consisting essentially of $CaCl_2 \cdot H_2O$, $SiO_2$, MgO, $Al_2O_3$, $Fe_2O_3$, and FeO.

2. A magnetic disc device according to claim 1, wherein said moisture removing mechanism is disposed sufficiently close to a heat generating source (15) in said enclosure and in a passage of wind caused by rotation of said magnetic disc such that a change in temperature of said moisture removing mechanism substantially corresponds to a change in temperature of said device.

3. A magnetic disc device according to claim 1, wherein said container is made of metal.

4. A magnetic disc device according to claim 1, wherein said container is made of synthetic resin.

5. A magnetic disc device according to claim 1, wherein said moisture removing mechanism further includes a throttle which restricts an air flow rate into and out of said moisture removing mechanism so as to permit regulation of a moisture absorbing rate of said reversible desiccating agent.

* * * * *